FIG.—1

United States Patent Office 2,780,103
Patented Feb. 5, 1957

2,780,103

DIFFERENTIAL PRESSURE DEVICE WITH COMPENSATING DEVICE

William H. Magearl, Baton Rouge, La., assignor to Esso Research and Engineering Company, a corporation of Delaware Application April 1, 1953, Serial No. 346,247

8 Claims. (Cl. 73—406)

This invention relates to improvements in differential pressure transmitters or recorders and more particularly relates to a compensating means to be used when measuring differential pressures.

One specific form of the present invention is adapted for use in connection with a differential pressure indicator and provides for a compensating means to automatically compensate for the difference in height of sealed legs between an upper tap and a lower tap arranged on a tower, such as a fractionating tower. The compensating means may be used in other applications.

In the fractionation of vapors it is desirable to maintain efficient operation of the tower with the greatest amount of throughput of vapors as is possible and consistent with good fractionation and it is also necessary to avoid flooding of the tower. One method of determining proper operation of the tower is to measure the pressure drop across the tower, that is, from top to bottom and by doing this substantially continuously a good indication will be given of the operation of the tower. Any surges or flooding of the tower will be reflected in increased pressure drops across the tower and this will be apparent by the differential pressure measurement.

Previous devices for measuring differential pressures in towers have been complicated and not entirely satisfactory.

In the preferred form of the invention compensating means are provided for differential pressure measurements across a fractionating tower. The instrument assembly includes a conventional differential pressure transmitter having only slight displacement of the measuring element, a seal leg compensator and a pneumatic receiver indicator or recorder. The differential pressure measurements are taken between a top tower tap and a bottom tower tap and the compensator provides automatic compensation for the difference in the seal leg height or head of the line leading to the top tower tap and the seal leg height or head of the line leading to the bottom tower tap.

Figure 1:
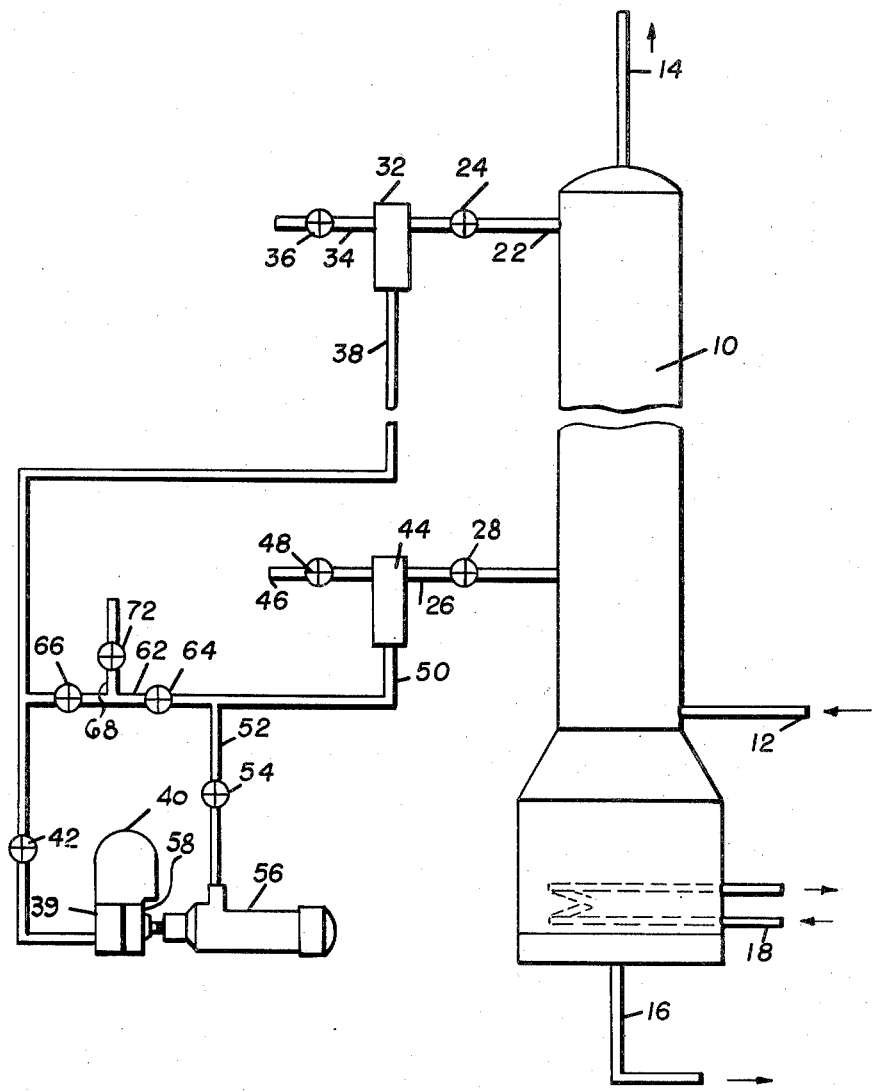
Fig. 1 represents a diagrammatic elevation of a tower provided with a compensating device made according to this invention.

Referring now to the drawing the reference character 10 designates a tower which may be a vapor-liquid contacting tower such as a fractionating tower or a liquid-liquid contacting tower. For the purposes of the description specific reference will be made to a tower for fractionating hydrocarbons but the invention is not to be restricted thereto. A line 12 is provided for introducing heated hydrocarbons to be fractionated into the lower portion of the tower 10. Fractionated vapors are taken ovehead from the tower by line 14 and bottoms are removed through line 16. If desired a reboiler 18 may be provided at the bottom of the tower 10 for supplying heat to the bottom of the tower.

The fractionating tower contains a number of bubble trays (not shown) and there is a pressure drop from the inlet line 12 to the outlet line 14 of the tower during fractionating due to the passage of the upflowing vapors through plate openings etc. In normal operation of the tower there will be a definite pressure drop across the tower 10 from the bottom to the top and by measuring and noting this pressure drop an indication is given that the tower is operating properly. However, if surges in vapors occur or if irregularities occur in the feed rate of hydrocarbon through line 12, or if the temperature of the feed in line 12 becomes too high or too low or if the tower floods, the pressure drop through the tower 10 will change appreciably and this change in pressure drop will indicate that the tower is not operating properly.

The system for measuring pressure drop according to the present invention will now be described.

The tower 10 is provided with a top pressure tap line 22 provided with valve 24 and a bottom pressure tap line 26 provided with a valve 28. Seal pot 32 communicates at its top with top tap line 22 and has a line 34 provided with a valve 36. Seal leg 38 communicates with the bottom of seal pot 32 and leads to the low pressure side 39 of a conventional differential pressure device 40 such as the Foxboro differential pressure cell described in Foxboro Instrumentation Bulletin 420. Seal leg 38 adjacent pressure cell 40 is provided with a valve 42.

The Foxboro differential pressure cell measures differential pressure and operates on the force balance principle. The cell converts differential pressure into proportional air pressure and transmits this air pressure to remotely located pneumatic receiving instruments such as indicators, recorders, or controllers. An indicating gage may be close-coupled to the differential pressure cell, connected to the output air line and calibrated to read in differential pressure measurement.

Bottom pressure tap line 26 communicates with the top of seal pot 44 which has a line 46 provided with a valve 48. Lower and shorter seal leg 50 leads from the bottom of seal pot 44, and has an extension line 52 provided with valve 54 which leads to the seal leg compensator 56 diagrammatically shown in Fig. 1 and shown in greater detail in Figs. 2 and 3. The compensator 56 communicates with the high pressure side 58 of the differential pressure cell 40.

Seal pots 32 and 44 act as reservoirs for the sealing liquid and minimize the effect of loss of any sealing liquid by evaporation over a period of time etc. Also the seal pots 32 and 44 have a larger diameter than lines 38 and 50, 52 so that variation in the level is small if there is loss of small amounts of sealing liquid. Extending between lower seal leg 50 and top seal leg 38 is line 62 provided with valves 64 and 66 and another line 68 provided with valve 72. These lines and valves are provided for putting the pressure differential cell and seal leg compensator into operation and will be described in greater detail hereinafter.

Figure 2:
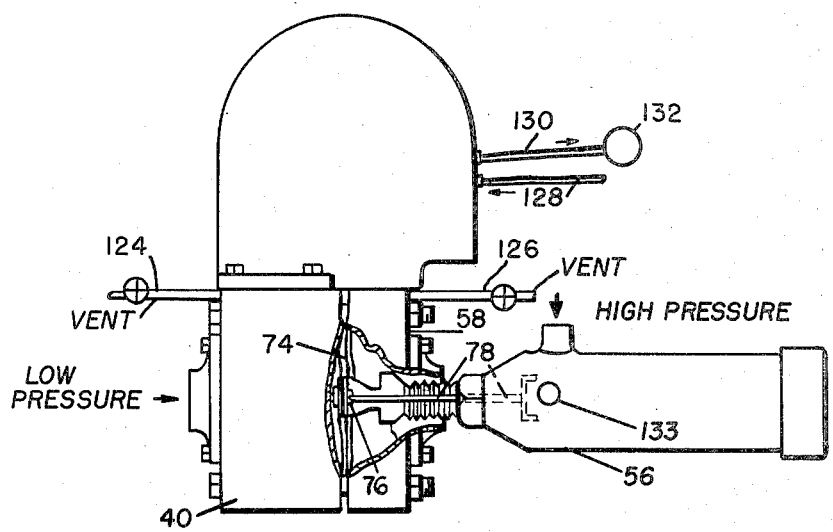
Fig. 2 represents a detailed showing of the compensating device applied to a conventional differential pressure indicator with parts broken away to facilitate the disclosure.

Fig. 2 shows a portion of the interior of the differential pressure cell with its central diaphragm 74 provided with a socket 76 for receiving the end of plunger 78 forming part of the seal leg compensator 56. The rest of the conventional pressure differential cell 40 is unmodified.

Figure 3:
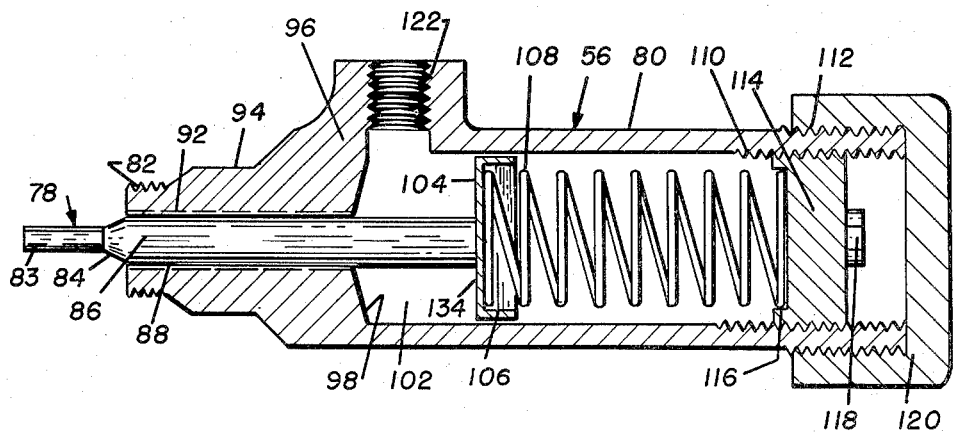
Fig. 3 represents an enlarged longitudinal cross sectional view of the compensating means.

Fig. 3 shows the seal leg compensator in greater detail. The housing 80 of the compensator has a reduced threaded end 82 which is threaded into the opening on the high pressure side 58 of the cell 40. The plunger 78 has a small end portion 83 leading to bevelled portion 84 spaced from the end leading to a larger shaft portion 86 which is slidably mounted in longitudinal opening 88 in the housing 80 of the compensator 56 and is of only slightly larger size than shaft 86. The shaft 86 is preferably polished to give a smooth finish to it. Grooves 92, shown dotted, are provided in the internal surface of opening 88 to permit transfer of pressure from the compensator to the high pressure side of diaphragm 74. The housing 80 of the compensator 56 adjacent the threaded end 82 has an enlarged shoulder portion 94 which is preferably hexagonal or other angular shape to permit use of a wrench or the like in screwing the compensator in fluid tight relation with the opening on the high pressure side of the differential pressure cell 40.

Beyond the enlarged shoulder portion 94 the housing 80 of the compensator 56 has a further enlarged portion 96 which has its internal surface cut away or bevelled as at 98 to provide an enlarged circular space 102. That is, the housing 80 of the compensator 56 is hollow and circular in cross section. The inner end of shaft 86 extends through this space 102 and at its inner end is provided with an enlarged circular head 104. The shaft 86 and circular head 104 are preferably integral but they may be made in separate pieces and rigidly connected together in any desired manner. The circular head 104 is provided with a groove or depression 106 for receiving one end of compensating coil spring 108, which is arranged in the hollow portion 102 of the housing of compensator 56 and which is nearly the same diameter as space 102.

The end of the housing 80 of compensator 56 opposite threaded end 82 is open ended and internally threaded at 110 and externally threaded at 112. Screwed into internal threads 110 is threaded adjusting head or plug 114 having a depression or cut-away portion 116 at its inner end to receive the other end of spring 108. The plug 114 is arranged entirely in the housing 80 of compensator 56. The plug 114 at its outer end has a hexagonal or other angular projection or depression 118 which may be engaged by a wrench or the like to adjust the compression of the spring 108 as desired. Spring 108 holds the end of plunger 78 in contact with socket 76 on diaphragm 74 but there is no other connection between plunger 78 and socket 76. Threaded over the exterior threads 112 of the end of the housing of the compensator 56 is a seal cap 120 to close the end of the housing and seal it. The cap 120 has a knurled or other exterior to assist in screwing it into sealing position.

Adjacent the enlarged portion 96 the housing 80 of compensator 56 has a pressure connection and pipe tap 122 which receives line 52 from bottom seal leg 50.

In Fig. 2 the conventional pressure differential cell is shown as having conventional vents 124 and 126. Also diagrammatically shown in Fig. 2 is inlet line 128 and outlet line 130 which are conventional and which show lines for introducing air under pressure to the differential pressure cell and for releasing it by the cell. The air under pressure is used in the unmodified portion of the Foxboro cell to give an indication of the differential pressure. Also shown is a dial 132 which is a pressure indicator but which may be a recorder such as a pneumatic receiver-recorder or the like. Compensator 56 also has a vapor vent line 133.

In order to guide the movement of shaft 86 in the internal hollow space 102 adjacent enlarged portion 96 of the housing 80, a bellows (not shown) may be arranged between the inner surface of enlarged portion 96 and the flat face portion 134 of the enlarged circular head 104 and surrounding and spaced from shaft 86. The spring 108 forces plunger 78 outwardly so that the outer end 83 of plunger 78 is at all times engaged with socket 76 on diaphragm 74.

When the compensator is in operation, the seal legs 38 and 50, 52 are filled with a liquid which is immiscible with the liquids being fractionated and which has a density heavier than the heaviest component being fractionated in the tower. When fractionating hydrocarbons, the seal liquid is water and in the winter time in regions where water might freeze some antifreeze solution such as ethylene glycol is added to lower the freezing point of the liquid. Other anti-freeze solutions such as glycerine or other sealing liquids may be used.

To place the pressure differential instrumentation into operation the following steps are taken. The present arrangement may be used with any size of tower and with the pressure taps as shown at the top at 22 and at the bottom at 26 and with no differential pressure across the diaphragm type differential pressure transmitter which is a Foxboro differential pressure cell as above described, the output air pressure from line 130 going to recorder 132 is adjusted to 3 lbs./sq. inch for the zero setting which is the standard accepted value for all pneumatic transmitting devices of this type.

Then valves 72, 66, 64, 42, 54, 48, and 36 are left open. Also vent lines 124 and 126 (Fig. 2) on the cell 40 are opened. The cell, compensator and both seal legs 38 and 50, 52 are filled with a sealing liquid pumped through valve 72 and line 62 as from a manifold (not shown). When one side of the cell 40 and seal leg 50, 52 leading to the bottom tap 26 and seal pot 44 are filled with the sealing liquid, valve 64 (Fig. 1) and vent 126 (Fig. 2) are closed and the pumping is continued until the other side of cell 40 and seal leg 38 leading to the top tap 22 and seal pot 32 are filled with the sealing liquid. Valve 66 (Fig. 1) and vent 124 (Fig. 2) on cell 40 are then closed.

With valves 42, 54, 48 and 36 open, a differential pressure exists across the differential pressure transmitter or cell 40 equal to the difference in height or head between the two seal legs 38 and 50, 52. Then the spring 108 of the compensator 56 is compressed by screwing down on plug 114. Compression of spring 108 forces plunger or rod 78 against the diaphragm 74 in the cell 40. The spring is compressed until a force equal to and opposite to the force exerted by the seal leg difference is set up thereby compensating for the difference in seal leg heights and again establishing a balance across the differential pressure transmitter or cell 40. This balance, when reached, is determined by the 3 lbs./sq. inch output air presure of the cell 40 which was established at the beginning.

Then valve 36 in line 34 and valve 48 in line 46 are closed and valve 24 in top tap line 22 and valve 28 in bottom tap line 26 are opened and the cell 40 is then ready for operation. The differential pressure cell 40 will now read only the difference in pressure in the tower 10 between top tap 22 and bottom tap 26 as transmitted by the seal liquid in the seal legs to the cell 40 and compensator 56.

The difference in travel of the differential pressure measuring element (diaphragm) is very small and the compression travel of the spring in the compensator is large so that any error produced is negligible. However, this error can be predetermined in amount and compensated for in the dry calibration of the cell 40.

Very wide flexibility can be accomplished by changing springs in the compensator, that is, stronger or weaker springs may be substituted for the spring in the compensator. Because of the construction this can be very easily and readily done.

The arrangement of devices or instrument assembly above described may be used as regular equipment on a fractionating tower to keep a continuous record of the pressure drop across the tower. By watching the recorder and the pressure drop recorded it will be quickly determined whether or not the tower has been normally operating with a substantially constant pressure drop. Any abrupt changes in pressure drop across the tower will show that there is an upset in the fractionating tower and this is a means for the early detection of tower operation upsets. By checking the pressure drop, the operation can be brought back to normal, if necessary, before any serious consequences result. By maintaining the pressure drop substantially constant, the fractionation is properly carried out and the desired product, without contamination of other products, is obtained overhead.

Or the instrument assembly above described may be mounted on a standard and be portable so that it can be moved from one tower to another to record or indicate the pressure drop through such a tower. Also the instrument assembly can be used to put a fractionating tower into operation and thereby determine the best operation for such tower by determining the best pressure drop to be utilized to get the most efficient operation of the tower.

In such operation the conditions in the tower are changed to determine best operation. Conditions such as rate of feed, preheat of feed, reflux ratio, etc. may be varied and changes noted by the device of the present invention to arrive at the best conditions for the tower. If desired 3 taps may be used with one being intermediate the ends of the tower so that different portions of the tower may be tested or measured for performance. More than 3 taps may be used. In such testing or measuring the pressure drop across two taps is taken as above described and when 3 taps are provided, the pressure drop across the bottom and intermediate taps may be taken and/or across the top and intermediate taps and/or across the top and bottom taps as previously described.

The arangement of devices above described may be used with towers of any height.

The compensating element has another valuable application other than for differential pressure measurement across a tower. The compensating element 56 can be used on the low pressure side of a diaphragm type differential pressure transmitter or cell (not shown but similar to cell 40) and the instrument assembly used to indicate small changes in pressure when applied to a system having a relatively large working pressure. This is accomplished by compensating for a large amount of the large working pressure present, say about 85 to 95%, by means of the compensator 56 and then measuring a small amount of the upper range of the pressure with a differential pressure transmitter or cell having a small total range. With this arrangement, the low pressure side of the transmitter or cell is left open to the atmosphere and the high pressure side is connected to the system where the pressure is to be measured.

The present instrument assembly is especially adapted for use with fractionating towers in which hydrocarbon mixtures are separated into desired fractions. The compensating device has been installed on a number of fractionating towers. In one tower used for separating $C_3$ and $C_4$ hydrocarbons where propane goes overhead and butanes are taken off as a bottoms stream, the tower operates at a pressure of about 375 to 400 p. s. i. g. (pounds per square inch gage), the tower is about 79 feet high and about 8 feet in diameter. The taps 22 and 26 are about 70 feet apart. There are 30 plates in the tower. The seal liquid in the seal legs is 50–50 water and ethylene glycol. The feed stream containing primarily $C_3$ and $C_4$ hydrocarbons is fed into the tower through line 12 at a rate of about 14,500 barrels per day and at a temperature of about 155° F. About 4,500 barrels of $C_3$ hydrocarbons per day are recovered through top outlet line 14.

In normal operation the pressure drop through this tower is about 3 pounds per square inch and stays about the same for efficient operation of the tower. If the pressure drop increases to 3.5 pounds per square inch in this tower, it is known that flooding of the tower occurs. If the rate of feed of hydrocarbons through line 12 is erratic or if heating of the feed hydrocarbons is irregular, this will shown up in the chart as an irregular line rather than a smooth curve. The fuel feed rate or heating of the feed is the most important of these two factors affecting pressure drop. Abnormalities or irregularities or upsets show up immediately on the differential pressure charts and this shows the sensitivity and stability of the instrument.

The instrument assembly has also been installed on a debutanizer tower where butanes are taken overhead from gasolines or naphthas. Smooth and stable operation was indicated by the instrument assembly. However, in this tower the compensator was used in a slightly different manner in that it was installed across the lower 10 trays.

The debutanizer tower is about 85 feet high and 9'6" in diameter and has 30 plates. It operates under a pressure of about 225 p. s. i. g. The feed to the tower comprises a naphtha fraction from which butanes and lighter are to be removed overhead. The feed is heated to about 215° F. and about 17,600 barrels per day are fed to the tower. About 11,000 barrels (as liquid) per day of butanes are recovered.

For this operation the instrument assembly was calibrated as follows. The meter or instrument assembly of this invention including all lead lines was hooked up to this tower and the differential pressure Foxboro cell was zeroed with 3 lbs. p. s. i. g. output transmitted air and no differential across the instrument assembly. The instrument assembly was installed across the bottom section of the debutanizer tower and across about the lower 10 trays of the 30 tray tower. Then both bottom and top seal legs were sealed with water. Then by means of compressing the spring 108 of the compensator 56, the differential pressure Foxboro cell was again balanced to zero which was indicated by the 3 lbs. per square inch outlet air pressure. Then by means of an air pressure regulator and a pressure gage connected to the bottom seal pot, like pot 44, on the tower and the top seal pot, like seal pot 32, open to atmosphere, a regulated air pressure was supplied to the high pressure side of the measuring element (diaphragm of the Foxboro cell) through the bottom seal leg, like leg 50, 52, and compensating unit. It required a differential pressure of 4.75 p. s. i. g. across the diaphragm to indicate a maximum reading on the pressure gage or recording chart associated with the Foxboro cell. This is known as full range calibration. The pressure of 4.75 p. s. i. g. was applied to the high pressure side with the low pressure side open to atmosphere through the seal leg. The seal legs like legs 38, 50, 52 are then put in operation as above described. Half range required an air pressure of 2.37 p. s. i. g. which illustrates the linearity of the meter.

The instrument assembly of the present invention may be used on any size fractionating tower having any pressure drop because the compensating spring can have its compression adjusted and weaker or stronger springs can be substituted for the spring found to be inadequate.

In one form of the device, the housing 80 is about 8 inches long and about 2 inches in outside diameter and about 1 9/16 inches internal diameter. The plunger 86 is about 4½ inches long and has a head 104 of about 1½ inches in diameter. The spring 108 is about 1¼ inches in diameter and about 3 inches long. The pressure connection 122 has a ¼ inch screw tap. Connection 122 has an outside diameter of about 1⅛ inches. The wall thickness of housing 80 is about ¼ inch. The depression 106 in plunger head 104 and the depression 116 in adjusting plug 114 are about 1 5/16 in. in diameter. The small end 83 of plunger 78 has a diameter of about 3/16 of an inch and the larger portion 86 of the plunger 78 in passageway 88 is about 5/16 of an inch with the passageway 88 being about 11/32 of an inch. The enlarged space 102 has a diameter of about 1 9/16 inches. The internal threads 110 extend for about 2¾ inches.

The above dimensions are given for one form of the device for purposes of illustration only and variations and changes may be made without departing from the spirit of the invention.

What is claimed is:

1. A compensating device of the character described adapted to be removably attached to a pressure measuring instrument including a hollow housing having at one end a reduced externally threaded portion adapted for fluid tight engagement with a pressure measuring instrument, the opposite end of said housing being internally threaded, an adjusting plug threaded into the last-mentioned end of said housing, said reduced housing portion being provided with a small passageway, a plunger having an enlarged head within said housing and a shaft portion which extends through said passageway and beyond the end of said housing and into said pressure measuring instrument, a coil spring arranged between said enlarged head and said adjusting plug for adjusting compression on said spring, said housing adjacent said spring being provided with a conduit leading from said housing whereby pressure may be supplied to the interior of the housing.

2. A device of the character described in claim 1 wherein said passageway through which said shaft portion extends is a relatively loose fit to permit passage of fluid therethrough.

3. A combination of the character described including a diaphragm type pressure differential transmitter having a high pressure side and a low pressure side and having its main diaphragm modified to include a socket on the high pressure side, said low pressure side being adapted to be connected with an upper pressure tap of a tower through a seal leg, said high pressure side being adapted to be connected with a lower pressure tap of a tower through a second seal leg, compensating means for adjusting for the difference in the heads of liquid in the seal legs, said compensating means being removably attached to said transmitter at the high pressure side and being connected to the seal leg for the lower pressure tap, said compensating means including a housing, plunger means slidably mounted in said housing and extending beyond one end of said housing and held in pressure contact with said socket on said high pressure side of the diaphragm of said transmitter, an adjusting plug threaded into the other end of said housing, and spring means between said plunger means and said adjusting plug.

4. In combination with a diaphragm type pressure differential transmitter having a main diaphragm, a vertical seal leg adapted to be connected with the upper portion of a tower, a vertical shorter seal leg adapted to be attached to the lower portion of the same tower, said seal legs terminating at their lower ends at about the same level, said seal legs being adapted to contain liquid and therefore produce different pressures at the lower end of the seal legs, said longer vertical seal leg at its lower end connected to one side of said pressure differential transmitter, a compensating device removably connected to the other end of said pressure differential transmitter, the lower end of said shorter vertical seal leg being connected to said compensating device, said compensating device including a housing, a plunger within said housing and having an end extending from said housing into said pressure differential transmitter and held in contact with said main diaphragm of said pressure differential transmitter, said plunger having an enlarged head at its inner end within said housing, a spring within said housing and contacting said enlarged head, and means associated with said housing for adjusting the compression on said spring and for maintaining the end of the plunger in engagement with said main diaphragm of said pressure differential transmitter.

5. An apparatus as defined in claim 4 wherein said main diaphragm is provided with a socket to receive the end of said plunger.

6. An apparatus for determining the pressure drop between two levels in a tower which apparatus includes a diaphragm type pressure differential transmitter, a vertical seal leg adapted to be connected with the upper portion of a tower, a vertical shorter seal leg adapted to be attached to the lower portion of the same tower, said seal legs terminating at their lower ends at about the same level, said seal legs being adapted to contain liquid and therefore produce different pressures at the lower end of the seal legs, said longer vertical seal leg being connected to one side of said pressure differential transmitter, a compensating device removably connected to the other end of said pressure differential transmitter, the lower end of said shorter vertical seal leg being connected to said compensating device, said compensating device including a housing, a plunger within said housing and having a reduced end extending from said housing and held in contact with said main diaphragm of said pressure differential transmitter, said plunger having an enlarged head at its inner end within said housing, a spring within said housing and contacting said enlarged head, an internal adjusting plug threaded into the end of the housing at the end opposite to the end attached to said pressure differential transmitter for adjusting the compression on said spring and for maintaining the end of the plunger in engagement with said main diaphragm of said pressure differential transmitter.

7. An apparatus as defined in claim 6 wherein said reduced end of said pluner is slidably mounted in a passageway in said housing which permits passage of fluid to and from said housing and said pressure differential transmitter.

8. An apparatus as described in claim 6 in which the upper ends of said seal legs are provided with reservoirs larger than the seal legs for containing relatively large amounts of liquid as compared to the amount of liquid adapted to be contained in said seal legs.

References Cited in the file of this patent

UNITED STATES PATENTS

| | | |
|---|---|---|
| 2,178,927 | Campbell | Nov. 7, 1939 |
| 2,520,547 | Hughes | Aug. 29, 1950 |
| 2,584,455 | Hughes | Feb. 5, 1952 |
| 2,648,345 | Markson | Aug. 11, 1953 |

FOREIGN PATENTS

| | | |
|---|---|---|
| 24,426 | Great Britain | Oct. 27, 1913 |